United States Patent
Nogami

(10) Patent No.: US 7,593,294 B2
(45) Date of Patent: Sep. 22, 2009

(54) OPTICAL PICKUP

(75) Inventor: Toyoshi Nogami, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 626 days.

(21) Appl. No.: 11/152,567

(22) Filed: Jun. 14, 2005

(65) Prior Publication Data

US 2005/0280909 A1 Dec. 22, 2005

(30) Foreign Application Priority Data

Jun. 17, 2004 (JP) .............................. 2004-179657

(51) Int. Cl.
*G02B 7/02* (2006.01)
(52) U.S. Cl. .............. 369/44.14; 369/44.15; 369/44.13; 359/813
(58) Field of Classification Search .............. 369/44.14, 369/44.15, 44.16, 44.32; 359/823, 819, 824
See application file for complete search history.

(56) References Cited

U.S. PATENT DOCUMENTS

| | | | | |
|---|---|---|---|---|
| 5,777,806 | A * | 7/1998 | Ikegame et al. | ............. 359/823 |
| 5,926,327 | A * | 7/1999 | Bae | ............. 359/824 |
| 6,091,553 | A * | 7/2000 | Song et al. | ............. 369/44.14 |
| 7,028,318 | B2 * | 4/2006 | Tajiri | ............. 369/44.32 |
| 2002/0105898 | A1 | 8/2002 | Fujikawa | |
| 2003/0058550 | A1 | 3/2003 | Ju | |

FOREIGN PATENT DOCUMENTS

| | | |
|---|---|---|
| JP | 2002-237068 | 8/2002 |
| JP | 2002-269781 | 9/2002 |
| JP | 2003-123289 | 4/2003 |
| JP | 2003-196866 | 7/2003 |
| JP | 2004-63051 | 2/2004 |
| JP | 2004-103086 | 4/2004 |

OTHER PUBLICATIONS

European Search Report for European Application No. 05012582.2-1232, dated Apr. 13, 2007 (4 pages).
Office Action issued in Japanese Patent Application No. 2004-179657, mailed Apr. 11, 2006, 4 pages.

(Continued)

*Primary Examiner*—William J Klimowicz
*Assistant Examiner*—Kim-Kwok Chu
(74) *Attorney, Agent, or Firm*—Osha • Liang LLP

(57) ABSTRACT

An optical pickup includes a lens frame, and the lens frame includes protruding portions provided with through-holes, coil connecting portions protruding away from a supporting-wire holding portion at corners. The coil connecting portions are provided with cutout portions constituted by two surfaces intersecting each other at the both side surfaces of the coil connecting portions in order to form waist portions at a wound portion. Supporting wires are overlapped with the lead wires wound around the waist portions of the coil connecting portions when viewed from above and connected to these wound lead wires with solder. With this configuration, it is possible to provide an optical pickup which enables connecting the terminated portions of the wound coil lead wires and the supporting wires with a reduced amount of solder, thereby reducing the weight and the cost.

4 Claims, 4 Drawing Sheets

OTHER PUBLICATIONS

Patent Abstracts of Japan, Publication No. 2004-063051, Publication Date Feb. 26, 2004, 1 page.
Patent Abstracts of Japan, Publication No. 2004-103086, Publication Date Apr. 2, 2004, 1 page.
Patent Abstracts of Japan, Publication No. 2002-269781, Publication Date: Sep. 20, 2002, 1 page.
Patent Abstracts of Japan, Publication No. 2003-123289, Publication Date: Apr. 25, 2003, 1 page.
Patent Abstracts of Japan, Publication No. 2003-196866, Publication Date: Jul. 11, 2003, 1 page.
Patent Abstracts of Japan, Publication No. 2002-237068, Publication Date: Aug. 23, 2002, 1 page.

* cited by examiner

OPTICAL PICKUP

BACKGROUND OF THE INVENTION

1. Field of the Invention

The present invention relates to an optical pickup incorporated into a CD (Compact Disc) player or a DVD (Digital Versatile Disc) player and, more specifically, to an optical pickup including a supporting structure for supporting a lens frame for holding an objective lens for irradiating a CD or DVD track with light, which is configured to be easily fabricated, require a reduced amount of component material and have high reliability.

2. Description of the Background Art

An objective lens for irradiating a recording medium such as a CD or DVD with light is secured to a lens frame and, by moving the lens frame along the surface of the recording medium together with the objective lens, information formed on the track of the recording medium can be read. In order to generate forces for moving the lens frame, plural coils such as a focus coil for adjusting the distance to the recording medium and driving coils for moving the lens frame along the surface of the recording medium are mounted to the lens frame.

In order to support the lens frame such that it can be moved by the forces generated from the coils, supporting wires having excellent elasticity are attached at their ends to the both side surfaces of the lens frame such that they sandwich the lens frame. The supporting wires are also attached at their root portions to a supporting-wire holding portion which houses a control circuit for adjusting the electric currents flowing through the coils mounted to the lens frame.

On the side surfaces of the lens frame to which one ends of the above-mentioned supporting wires are attached, the end portions of the lead wires constituting the above-mentioned coils are placed. Electric currents controlled by the above-mentioned control circuit are flowed through the above-mentioned supporting wires and thus the controlled electric currents are flowed from the end portions of the supporting wires for supporting the lens frame to the end portions of the above-mentioned coil lead wires. The focus coil adjusts the distance to the recording medium to draw focus thereto. The driving coils induce predetermined movements of the lens frame such as rotations thereof along the surface of the recording medium. Further, tilting coils for tilting the lens frame with respect to the recording medium are also placed and they are fed with electric currents through the supporting wires to cause predetermined tilting movements.

The structure for mounting the supporting wires to the lens frame and the structure for mounting the end portions of the above-mentioned various coil lead wires to the lens frame require procedures involving plural processes which affect the manufacture costs of the optical pickup. The above-mentioned structures for mounting the supporting wires and the end portions of the coil lead wires to the lens frame may induce reliability issues and therefore many propositions have been made. For example, there has been proposed a method which provides two parallel protrusions on one end surface of the lens frame, wherein the protrusion nearer the supporting-wire holding portion is provided with through-holes for passing the supporting wires therethrough, the end portions of the coil lead wires are wound around the other protrusion, and the supporting wires are secured to the wound portions with solder.

Further, the provision of two protrusions on a single side surface as above requires plural processes and also increases the weight and the material cost. Therefore, there has been proposed a structure in which a single protrusion is provided on one side surface of the lens frame, the single protrusion is provided with a winding terminating portion for winding the end portions of the coil lead wires therearound and through-holes for the above-mentioned supporting wires near the winding terminating portion, and the supporting wires passing through the through-holes and the wound lead wires are connected with solder (see Japanese Laid-Open Patent Publication No. 2002-269781).

In the above-mentioned structure in which a single protrusion is provided on one side surface at a single height, the portion around which the end portions of the coil lead wires are wound and the supporting wires passing through the through-holes are separated from each other when viewed from above, thereby requiring a large amount of solder in solder-connecting them. Further, the lead wires are tend to be wound many times in order to reduce the distance between the supporting wires and the lead wires when solder-connecting the supporting wires and the lead-wire wound portion. This may result in an increase of the weight and loss of balance during the movement of the lens frame.

Further, when attaching the supporting wires to the lens frame during an actual procedure, the lens frame is not supported until the lead-wire wound portion and the supporting wires are solder-connected, which makes the procedure complicated and difficult. Further, even if a winding slot is provided at the portion around which the lead wires are to be wound, it is difficult to wind the lead wires and, particularly, when it is desirable to manually wind the coil end portions, it is not easy to wind them manually. Further, when two protrusions are provided on one side surface and the lead wires are wound around one of the protrusion as described above, the other protrusion is contacted with the lead wires and becomes obstruction during the winding of the lead wires, thereby inducing the problem of complicating the procedure.

SUMMARY OF THE INVENTION

It is an object of the present invention to provide an optical pickup which enables simplifying a procedure for winding end portions of coil lead wires and for securing them to a lens frame, facilitating a procedure for attaching one ends of supporting wires to the lens frame and reducing the amount of used solder to reduce the weight and the cost.

An optical pickup according to a first aspect of the present invention is an optical pickup for irradiating a disc-type recording medium mounted along a surface which is parallel with a surface of a flat-plate type base portion with light through an objective lens. The optical pickup includes a lens frame to which the objective lens is mounted, which can move along the surface of the disc-type recording medium, and which has first to fourth side surfaces corresponding to four sides of a substantially rectangular shape when viewed from above, a plurality of first supporting wires mounted to the first side surface of the lens frame to support the lens frame and a plurality of second supporting wires mounted to the second side surface opposite to the first side surface to support the lens frame, a supporting-wire holding portion which extends upwardly and intersects with the surface of the flat-plate type base portion to hold root portions of the first and second supporting wires and to extend the supporting wires toward the lens frame, and a plurality of coils mounted to the lens frame to generate forces for moving the lens frame. The lens frame includes a first protruding portion protruding outwardly from the first side surface and a second protruding portion protruding outwardly from the second side surface, these protruding portions on the first and second side surfaces are both provided with through-holes for passing the first and second supporting wires therethrough, and the first and second supporting wires are secured in the through-holes with an adhesive. The lens frame also includes a plurality of first coil connecting portions protruding away from the supporting-wire holding portion at the corner at the intersection of the first side surface and the fourth side surface opposite to the third side surface faced to the supporting-wire holding portion and a plurality of second coil connecting portions protruding away from the supporting-wire holding portion at the corner at the intersection of the second side surface and the fourth side surface. The first and second coil connecting portions are provided with cutout-tapered portions forming waist portions with an extremely-small width and the end portions of the lead wires of the coils are wound around the waist portions of the coil connecting portions. The first and second supporting wires are overlapped with the lead wires wound around the waist portions of the first and second coil connecting portions when viewed from above and are connected to these wound lead wires with solder.

Preferably, in the optical pickup according to the first aspect of the present invention, the through-holes for passing the supporting-wires therethrough and the coil connecting portions for winding the lead wires to be connected through solder to the supporting-wires therearound are at different distances from the flat-plate type base portion.

Preferably, in the optical pickup according to the first aspect of the present invention, the coil connecting portions are shaped, when viewed from above, to include a rectangular root connecting portion protruding from the corner in parallel with one of the sides of the rectangular shape of the lens frame and a rectangular tip connecting portion protruding from the root connecting portion such that it intersects with the side of the lens frame in such a manner that the corner portion of the root connecting portion near the tip end portion and the corner portion of the tip connecting portion near the lens frame are overlapped and coupled with each other, and the continuous two sides form the waist portions at the intersection of the root connecting portion and the tip connecting portion when viewed from above.

Preferably, in the optical pickup according to the first aspect of the present invention, the protruding portions are provided at positions which do not exist on the lines elongated in the directions of windings of the lead wires of the coils wound around the coil connecting portions.

An optical pickup according to a second aspect of the present invention is an optical pickup for irradiating a disc-type recording medium mounted along a surface which is parallel with a surface of a flat-plate type base portion with light through an objective lens. The optical pickup includes a lens frame to which the objective lens is mounted, which can move along the surface of the disc-type recording medium, and which has first to fourth side surfaces corresponding to four sides of a substantially rectangular shape when viewed from above, a first upper supporting wire, a first middle supporting wire and a first lower supporting wire which are mounted to the first side surface of the lens frame at three different distances from the flat-plate type base portion and a second upper supporting wire, a second middle supporting wire and a second lower supporting wire which are mounted to the second side surface opposite to the first side surface at three different distances from the flat-plate type base portion, a supporting-wire holding portion which extends upwardly and intersects with the surface of the flat-plate type base portion to hold the root portions of the first and second supporting wires and to extend the supporting wires toward the lens frame, a focus coil which surrounds the lens frame and is constituted by a lead wire placed to be wound about a direction intersecting with the surface of the flat-plate type base portion, first and second driving coils constituted by a lead wire placed to be wound about the directions of extension of the supporting wires at the third side surface of the lens frame faced to the supporting-wire holding portion and the fourth side surface opposite to the third side surface, wherein the third side surface and the fourth side surface are at symmetric positions with respect to the center of the lens frame, first and second tilting coils provided to be wound about directions intersecting with the surface of the flat-plate type base portion at two positions sandwiching the midpoint between the first and second side surfaces of the lens frame, to generate forces for tilting the lens frame with respect to the surface of the disc-type recording medium. The tens frame includes a first protruding portion protruding outwardly from the first side surface and a second protruding portion protruding outwardly from the second side surface, the first protruding portion is provided with three through-holes for passing the first upper, middle and lower supporting wires therethrough, the supporting wires passed through the three through-holes are secured with an adhesive, the second protruding portion is provided with three through-holes for passing the second upper, middle and lower supporting wires therethrough, the supporting wires passed through the three through-holes are secured with an adhesive. The lens frame also includes a first upper coil connecting portion, a first middle connecting portion and a first lower connecting portion which are protruded away from the supporting-wire holding portion at the corner at the intersection of the first side surface and the fourth side surface, at three different distances from the flat-plate type base portion, and a second upper coil connecting portion, a second middle connecting portion and a second lower connecting portion which are protruded away from the supporting-wire holding portion at the corner at the intersection of the second side surface and the fourth side surface, at three different distances from the flat-plate type base portion. The first and second upper, middle and lower coil connecting portions are provided with cutout portions constituted by two surfaces intersecting each other at the both side surfaces of the coil connecting portions in order to form waist portions. The end portions of the lead wire of the focus coil are wound around the waist portions of the first and second upper coil connecting portion, one end portion and the other end portion of the lead wire of the first and second driving coils are wound around the waist portions of the first and second middle coil connecting portions and one end portion and the other end portion of the lead wire of the first and second tilting coils are wound around the waist portions of the first and second lower coil connecting portions. The first and second upper, middle and lower supporting wires are overlapped with the lead wires wound around the waist portions of the first and second upper, middle and lower coil connecting portions when viewed from above and connected to these wound lead wires with solder.

With the above-mentioned configuration, the end portions of the coil lead wires can be easily wound around the waist portions of the coil connecting portions protruded from the corners, and the terminated portions of the coil lead wires can be fitted and settled at the waist portions with a small number of windings. The coating layers or the like have been removed from the terminated portions of the coil lead wires for solder-connection and, when the number of windings is large, the solder may be drawn into space among the wound lead wires and a large amount of solder may be adhered thereto due to their excellent wettability, thereby increasing the weight and obstructing the smooth movement of the lens frame. However, the lead wires can be wound around the cutout portions with a reduced number of windings, thereby reducing the amount of solder and avoiding inconvenience which would be caused by increased weights.

Further, when the process is manually performed, the above-mentioned winding of coil lead wires is performed as follows. Coils are formed while the lead wire is drawn from a lead-wire supply reel and subsequently the lead wire is terminated while the lead wire is continuously drawn from the lead-wire supply reel. In this case, by drawing and trapping the coil lead wire into the cutout edges at the intersections of the side cutouts and the upper surface to generate stress-concentrated portions in the coil lead wire and then pulling the lead-wire supply reel, the coil lead wire can be cut at the cutout edges. The cut portion has been properly plastically deformed and thus engaged and settled to the cutout edges.

Therefore, even when the process is manually performed, since the lead wires are wound around the cutout portions of the coil connecting portions protruded from the corners of the lens frame, the lead wires can be wound around the portions without being obstructed. Further, since the lead wires are cut and then the wound lead wires having the settled terminated portions are solder-connected to the supporting wires, there is no need for clamps for securing the terminated portions of the lead wires and further there is no need for processes for attaching and detaching them. Further, contact between the lead wires and the protruding portions can be avoided during the winding of the lead wires around the coil connecting portions. This enables performing the procedure manually.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
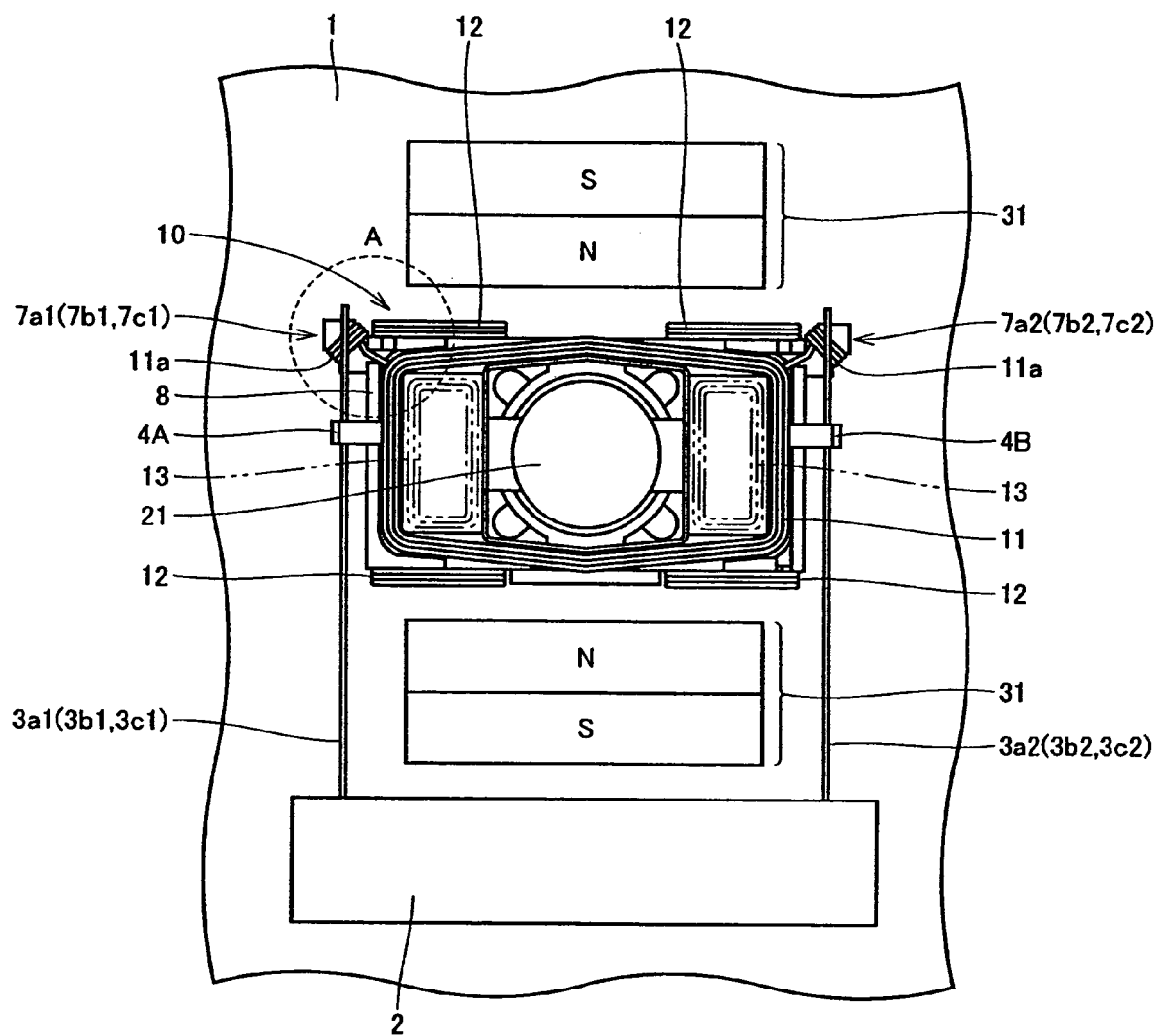
FIG. 1 is a view illustrating an optical pickup according to an embodiment of the present invention.

Next, embodiments of the present invention will be described using the drawings. As illustrated in FIG. 1, in an optical pickup 10, a lens frame 8 for holding an objective lens 21 is held by supporting wires 3a1, 3b1, 3c1, 3a2, 3b2, 3c2 such that it can be moved along the surface of a flat-plate type base portion 1. In optical pickup 10 illustrated in FIG. 1, the respective three supporting wires 3a1, 3b1, 3c1 and the respective three supporting wires 3a2, 3b2, 3c2 are overlapped with one another at both sides of lens frame 8, when viewed from above. However, in general, it is not necessary that they are overlapped.

Supporting wires 3a1, 3b1, 3c1, 3a2, 3b2, 3c2 are secured at their root portions to a supporting-wire holding portion 2 which protrudes upwardly from flat-plate type base portion 1. This supporting-wire holding portion 2 houses a control circuit board (not shown) for adjusting the electric currents flowing through coils attached to lens frame 8 to control the movement of lens frame 8. The above-mentioned controlled electric currents are flowed through supporting wires 3a1, 3b1, 3c1, 3a2, 3b2, 3c2 and then through coil lead wires wound around coil connecting portions 7a1, 7b1, 7c1, 7a2, 7b2, 7c2 to the respective coils for controlling the movement of lens frame 8.

There are a focus coil 11 which is wound about a direction intersecting with the surface of flat-plate type base portion 1 and placed to surround lens frame 8, driving coils 12 which are wound about the directions of extension of supporting wires 3a1, 3b1, 3c1, 3a2, 3b2, 3c2 such that they are deflected toward the side portions of lens frame 8 and tilting coils 13 which are placed at the both sides of objective lens 21 to sandwich objective lens 21 and wound about directions intersecting with the surface of flat-plate type base portion 1, wherein focus coil 11, driving coils 12 and tiling coils 13 are mounted to lens frame 8. Focus coil 11 generates a force along a direction intersecting with the surface of flat-plate type base portion 1, namely a stress for focusing objective lens 21 on the track formed on a disc-type recording medium. Driving coils 12 generate stresses in the direction along the surface of the flat-plate type base portion for moving lens frame 8 horizontally in accordance with the track. Tilting coils 13 generate stresses for tilting lens frame 8 with respect to the surface of flat-plate type base portion 1. In order to increase the stresses generated by these coils 11, 12, 13, permanent magnets 31 are placed for generating magnetic fluxes intersecting with the annular electric currents of coils 11, 12, 13.

The above-mentioned supporting wires 3a1, 3b1, 3c1, 3a2, 3b2, 3c2 have the function of flowing electric currents through the respective coils 11, 12, 13 individually by being electrically connected to the end portions of the coil lead wires which are wound around coil connecting portions 7a1, 7b1, 7c1, 7a2, 7b2, 7c2. Therefore, supporting wires 3a1, 3b1, 3c1, 3a2, 3b2, 3c2 have the function of introducing the controlled electric currents into the respective coils 11, 12, 13 individually, in addition to holding coil frame 8 such that it can be mechanically moved.

Supporting wires 3a1, 3b1, 3c1, 3a2, 3b2, 3c2 extend from supporting-wire holding portion 2 toward lens frame 8 and are placed such that they pass through through-holes formed through protruding portions 4A, 4B which protrude outwardly from the side surfaces of lens frame & and are overlapped with the coil lead wires wound around coil connecting portions 7a1, 7b1, 7c1, 7a2, 7b2, 7c2, when viewed from above. Each of protruding portions 4A, 4B is provided with three through-holes, upper, middle and lower through-holes, such that they are at different distances from the surface of flat-plate type base portion 1.

Although there are illustrated, in FIG. 1, only upper coil connecting portions 7a1, 7a2 around which the lead wires connected to focus coil 11 are wound, there are formed the middle coil connecting portions 7b1, 7b2 around which the lead wires of driving coils 12 are wound and the lower coil connecting portions 7c1, 7c2 around which the lead wires of tilted coils 13 are wound such that they are overlapped when viewed from above. Although four driving coils 12 are mounted in FIG. 1, these four driving coils 12 are constituted by a single continuous lead wire which is wound and, therefore, four driving coils 12 are placed in serial connection. Further, two tilting coils 13 are also placed in serial connection. Consequently, by using the two coil connecting portions, namely coil connecting portions 7a1, 7b1, 7c1 at the first side portion and coil connecting portions 7a2, 7b2, 7c2 at the second side portion, introduction and extraction of electric current can be performed.

Figure 2:
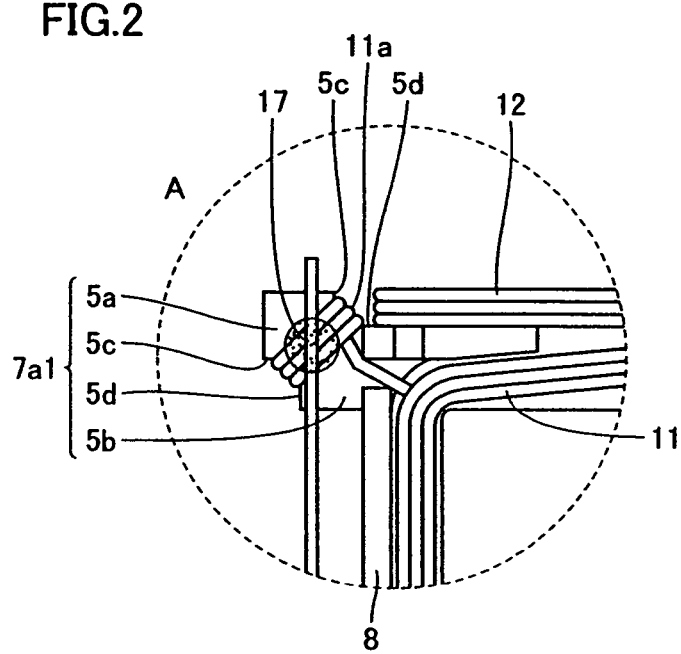
FIG. 2 is an enlarged view of an A portion of FIG. 1.

The characteristic of the present invention is the structure for supporting the lens frame with the supporting wires and the way of connecting the supporting wires to the wound coil lead wires. As illustrated in FIG. 2, for example, coil connecting portion 7a1 protrudes slantwise from the corner at the intersection of the fourth side surface and the first side surface such that it is away from supporting-wire holding portion 2. This coil connecting portion 7a1 is constituted by a rectangular root connecting portion 5b protruding in the direction of extension of the fourth side surface and a tip connecting portion 5a which is partially overlapped and continuous with the tip corner of root connecting portion 5b and extends toward the tip end portion.

Namely, each of coil connecting portions 7a1, 7b1, 7c1, 7a2, 7b2, 7c2 is shaped, when viewed from above, to include rectangular root connecting portion 5b protruding from the corner in parallel with one of the sides of the rectangular shape of lens frame 8 and rectangular tip connecting portion 5a protruding from root connecting portion 5b such that it intersects with the above-mentioned side of lens frame 8, wherein the corner portion of root connecting portion 5b near the tip end portion and the corner portion of tip connecting portion 5a near lens frame 8 are overlapped and coupled with each other and the continuous two sides form waist portions at the intersection of root connecting portion 5b and tip connecting portion 5a. Namely, the side surfaces 5d of rectangular root connecting portion 5b and the side surfaces 5c of rectangular tip connecting portion 5a are the intersecting two surfaces which form the cutout portions. In the cutout portions, taper faces are formed by side surfaces 5c and 5d in a width direction orthogonal to an extending direction of the coil connecting portions so as to have a minimum width when viewed from above.

In coil connecting portion 7a1, for example, the end portion of the lead wire of focus coil 11 is wound around the cutout portions to terminate the lead wire. Supporting wire 3a1 is placed such that it overlaps with the wound lead wire when viewed from above, and supporting wire 3a1 and the wound lead wire are electrically and mechanically coupled with each other through solder 17.

Figure 3:
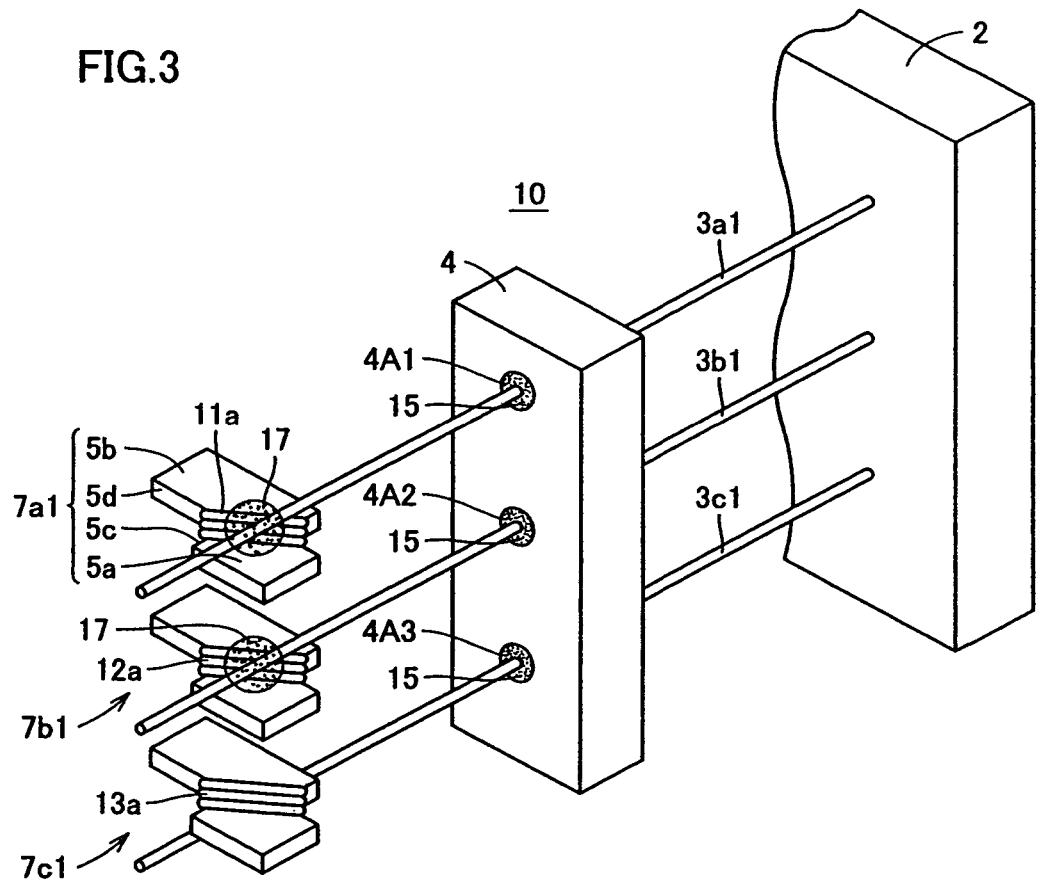
FIG. 3 is a view illustrating the structure for connecting supporting wires to protruding portions and coil connecting portions of the lens frame.

As illustrated in FIG. 3, protruding portion 4A protruding outwardly from the first side surface of lens frame 8 is provided with three through-holes 4A 1, 4A2, 4A3 for three supporting sires 3a1, 3b1, 3c1. Supporting wires 3a1, 3b1, 3c1 passing through these through-holes 4A 1, 4A2, 4A3 are secured by an adhesive 15 embedded in the gaps between through-holes 4A1, 4A2, 4A3 and supporting wires 3a1, 3b1, 3c1. By embedding adhesive 15, supporting wires 3a1, 3b1, 3c1 are secured such that they pass through through-holes 4A1, 4A2, 4A3 substantially at their center positions without the necessity of adjusting supporting wires 3a1, 3b1, 3c1 to cause them to pass through through-holes 4A1, 4A2, 4A3 at their center positions. With the same configuration, three supporting wires 3a2, 3b2, 3c2 are secured to protruding portion 4B at the second side surface of lens frame 8.

Upper supporting wire 3a1 connected to focus coil 11 is connected through solder 17 to the lead wire wound around upper coil connecting portion 7a1 and middle supporting wire 3b1 connected to driving coil 12 is connected through solder 17 to the lead wire wound around middle coil connecting portion 7b1. Lower supporting wire 3c1 connected to tilting coil 13 is connected through solder 17 to the lead wire wound around lower coil connecting portion 7c1. The winding directions of the end portions of the lead wires of coils 11, 12, 13 which are wound around coil connecting portions 7a1, 7b1, 7c1 are such that these winding directions intersect with the direction of extension of supporting wires 3a1, 3b1, 3c1 and protruding portion 4A does not exist on the lines elongated in these winding directions. With the same configuration in the second surface of lens frame 8, three supporting wires 3a2, 3b2, 3c2 are connected to the lead wires wound around coil connecting portions 7a2, 7b2, 7c2.

Figure 4:
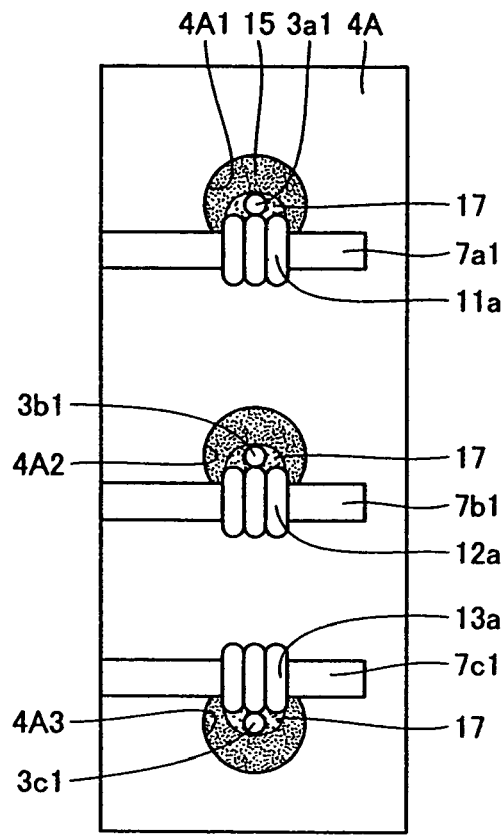
FIG. 4 is a view illustrating the positional relationship between the coil connecting portions and through-holes formed through the protruding portions of the lens frame.

It is necessary only that any one of a supporting wire and the coil connecting portion connected to this supporting wire is more distant from the surface of flat-plate type base portion 1 than the other one of them. For example, as illustrated in FIG. 4, while supporting wires 3a1, 3b1 are placed on the corresponding coil connecting portions 7a1, 7b1, they may be placed below the corresponding coil connecting portions 7c1 as supporting wire 3c1. Further, as illustrated in FIG. 4, the through-holes for passing the supporting wires therethrough and the coil connecting portions around which the lead wires to be solder-connected to the supporting wires are wound are at different distances from the flat-plate type base portion 1.

Figure 5:
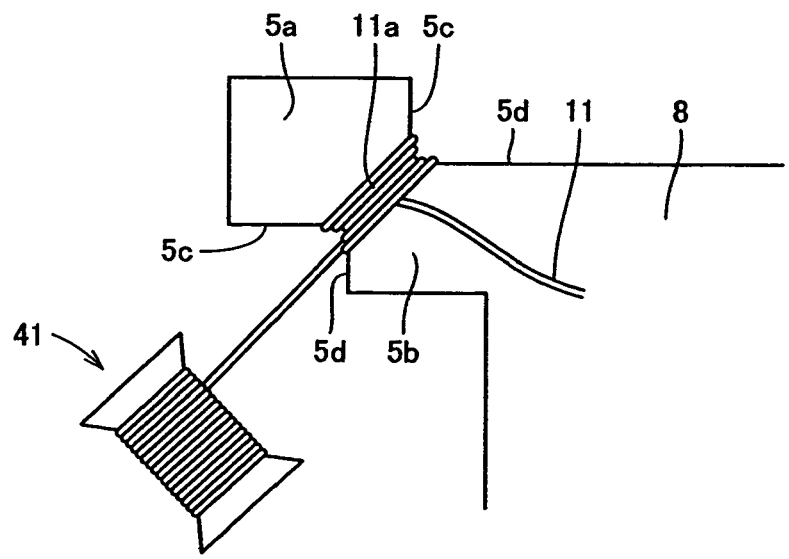
FIG. 5 is a view illustrating the procedure for cutting the to-be-terminated portion of the coil lead wire such that it is pinched at the waist portion.
Figure 6:
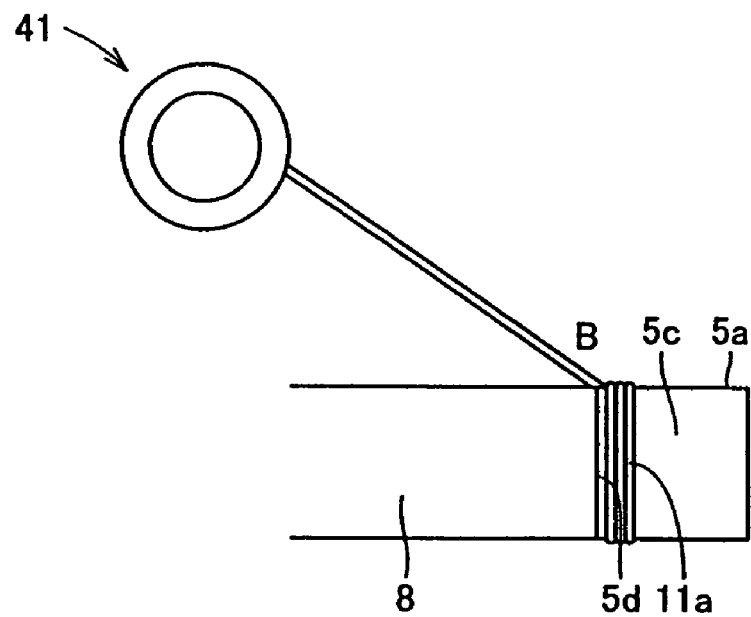
FIG. 6 is a side view of FIG. 5.

Next, there will be described the manual procedure for winding the end portions of the lead wires of the coils for terminating them. As illustrated in FIGS. 5 and 6, when pulling the lead wire such that it is pinched by the notch-shaped portions at the intersections of the upper surface and the waist portions formed by the two surfaces 5c, 5d, the lead wire is pinched between lead wires which have been already wound or between the surfaces of the waist portions and is partially stretched. Then, the lead wire is cut at the pinched portion B. The terminated portion of the coil lead wire which has been wound around the waist portions is settled and maintained at the state where it was cut as described above, and the lead wire will not be wound back.

Figure 7:
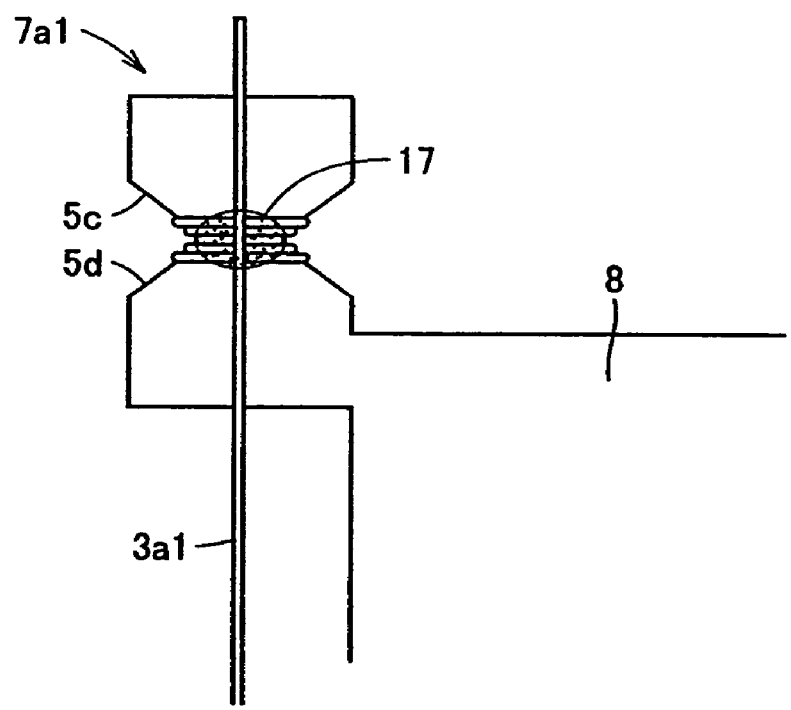
FIG. 7 is a view illustrating a coil connecting portion according to a modified embodiment of the present invention.

With a configuration according to a modified embodiment illustrated in FIG. 7, the direction of the wound lead wires is orthogonal to the direction of extension of the supporting wires. In this case, it is also easy to ensure the positional relationship between the wound lead wires and the supporting wires intersecting therewith. Further, it is easy to handle the to-be-terminated portions of the coil wire leads such that they are pinched by the waist portions. Consequently, the use of the waist portions as illustrated in FIG. 7 makes it easier to perform the operation of winding the coil lead wires.

Since in the above-mentioned winding operation the coil lead wires are wound around the waist portions, the winding operation is significantly easily performed. Further, contact between the lead wires and the protruding portions can be prevented during the winding of the lead wires around the coil connecting portions. Further, since the supporting wires and the wound lead wires are placed such that they are intersected with each other when viewed from above, it is possible to ensure the connection between the supporting wires and the wound lead wires even when the number of windings is reduced as compared with conventional. Further, even when the number of windings is reduced, the operating efficiency will not be degraded since the wound lead wires are cut such that they are pinched. When the number of windings is reduced, the amount of solder drawn into spaces among the wound wires can be reduced during solder connection, thereby reducing the amount of solder to be used and, therefore, the weight of the lens frame. This can reduce the weight of the coil connecting portions, thereby reducing the occurrence of obstructions to the movement of the lens frame.

As described above, the use of the optical pickup according to the present invention can reduce the number of windings of the end portions of the coil read lines around the waist portions of the coil connecting portions. The reduction of the number of windings can reduce the amount of solder to be used, thereby preventing weight increases and facilitating smooth movement of the lens frame. Further, it is made easier to wind them manually.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup for irradiating a disc-type recording medium mounted along a surface which is parallel with a surface of a flat-plate type base portion with light through an objective lens, the optical pickup comprising:

a lens frame to which said objective lens is mounted, which can move along the surface of said disc-type recording medium, and which has first to fourth side surfaces corresponding to four sides of a substantially rectangular shape when viewed from above;

a first upper supporting wire, a first middle supporting wire and a first lower supporting wire which are mounted to the first side surface of said lens frame at three different distances from said flat-plate type base portion and a second upper supporting wire, a second middle supporting wire and a second lower supporting wire which are mounted to the second side surface opposite to said first side surface at three different distances from said flat-plate type base portion;

a supporting-wire holding portion which extends upwardly and intersects with the surface of said flat-plate type base portion to hold the root portions of said first and second supporting wires and to extend the supporting wires toward said lens frame;

a focus coil which surrounds said lens frame and is constituted by a lead wire placed to be wound about a direction intersecting with the surface of said flat-plate type base portion;

first and second driving coils constituted by a lead wire placed to be wound about the directions of extension of said supporting wires at the third side surface of said lens frame faced to said supporting wire holding portion and the fourth side surface opposite to the third side surface, wherein the third side surface and the fourth side surface are at symmetric positions with respect to the center of said lens frame; and first and second tilting coils provided to be wound about directions intersecting with the surface of said flat-plate type base portion at two positions sandwiching the midpoint between the first and second side surfaces of said lens frame, to generate forces for tilting said lens frame with respect to the surface of the disc type recording medium, wherein said lens frame includes a first protruding portion protruding outwardly from said first side surface and a second protruding portion protruding outwardly from said second side surface, said first protruding portion is provided with three through-holes for passing said first upper, middle and lower supporting wires therethrough, the supporting wires passed through the three through-holes are secured with an adhesive, said second protruding portion is provided with three through-holes for passing said second upper, middle and lower supporting wires therethrough, the supporting wires passed through the three through-holes are secured with an adhesive, said lens frame also includes a first upper coil connecting portion, a first middle connecting portion and a first lower connecting portion which are protruded away from said supporting-wire holding portion at the corner at the intersection of said first side surface and said fourth side surface, at three different distances from said flat-plate type base portion, and a second upper coil connecting portion, a second middle connecting portion and a second lower connecting portion which are protruded away from said supporting-wire holding portion at the corner at the intersection of said second side surface and said fourth side surface, at three different distances from said flat-plate type base portion, the first and second upper, middle and lower coil connecting portions are provided with cutout portions constituted by two surfaces intersecting each other at the both side surfaces of said coil connecting portions in order to form waist portions, the end portions of the lead wire of said focus coil are wound around the waist portions of said first and second upper coil connecting portion, one end portion and the other end portion of the lead wire of said first and second driving coils are wound around the waist portions of said first and second middle coil connecting portions and one end portion and the other end portion of the lead wire of said first and second tilting coils are wound around the waist portions of said first and second lower coil connecting portions, and said first and second upper, middle and lower supporting wires are overlapped with the lead wires wound around the waist portions of said first and second upper, middle and lower coil connecting portions when viewed from above and connected to these wound lead wires with solder.

2. An optical pickup for irradiating a disc-type recording medium mounted along a surface which is parallel with a surface of a flat-plate type base portion with light through an objective lens, the optical pickup comprising:

a lens frame to which said objective lens is mounted, which can move along the surface of said disc-type recording medium, and which has first to fourth side surfaces corresponding to four sides of a substantially rectangular shape when viewed from above;

a plurality of first supporting wires mounted to the first side surface of said lens frame to support the lens frame and a plurality of second supporting wires mounted to the second side surface opposite to said first side surface to support the lens frame;

a supporting-wire holding portion which extends upwardly and intersects with the surface of said flat-plate type base portion to hold root portions of said first and second supporting wires and to extend the supporting wires toward said lens frame; and a plurality of coils mounted to said lens frame to generate forces for moving the lens frame, wherein said lens frame includes a first protruding portion protruding outwardly from said first side surface and a second protruding portion protruding outwardly from said second side surface, these protruding portions on the first and second side surfaces are both provided with through-holes for passing said first and second supporting wires therethrough, and said first and second supporting wires are secured in the through-holes with an adhesive, said lens frame also includes a plurality of first coil connecting portions protruding away from said supporting-wire holding portion at the corner at the intersection of the first side surface and the fourth side surface opposite to the third side surface faced to said supporting-wire holding portion and a plurality of second coil connecting portions protruding away from said supporting-wire holding portion at the corner at the intersection of the second side surface and said fourth side surface, the first and second coil connecting portions are provided with cutout-tapered portions forming waist portions with an extremely small width and the end portions of the lead wires of said coils are wound around the waist portions of said coil connecting portions, said first and second supporting wires are overlapped with the lead wires wound around the waist portions of said first and second coil connecting portions when viewed from above and are connected to these wound lead wires with solder, and wherein the through-holes for passing said supporting-wires therethrough and the coil connecting portions for winding the lead wires to be connected through solder to the supporting-wires therearound are at different distances from said flat-plate type base portion.

3. An optical pickup for irradiating a disc-type recording medium mounted along a surface which is parallel with a surface of a flat-plate type base portion with light through an objective lens, the optical pickup comprising:

a lens frame to which said objective lens is mounted, which can move along the surface of said disc-type recording medium, and which has first to fourth side surfaces corresponding to four sides of a substantially rectangular shape when viewed from above;

a plurality of first supporting wires mounted to the first side surface of said lens frame to support the lens frame and a plurality of second supporting wires mounted to the second side surface opposite to said first side surface to support the lens frame;

a supporting-wire holding portion which extends upwardly and intersects with the surface of said flat-plate type base portion to hold root portions of said first and second supporting wires and to extend the supporting wires toward said lens frame; and a plurality of coils mounted to said lens frame to generate forces for moving the lens frame, wherein said lens frame includes a first protruding portion protruding outwardly from said first side surface and a second protruding portion protruding outwardly from said second side surface, these protruding portions on the first and second side surfaces are both provided with through-holes for passing said first and second supporting wires therethrough, and said first and second supporting wires are secured in the through-holes with an adhesive, said lens frame also includes a plurality of first coil connecting portions protruding away from said supporting-wire holding portion at the corner at the intersection of the first side surface and the fourth side surface opposite to the third side surface faced to said supporting-wire holding portion and a plurality of second coil connecting portions protruding away from said supporting-wire holding portion at the corner at the intersection of the second side surface and said fourth side surface, the first and second coil connecting portions are provided with cutout-tapered portions forming waist portions with an extremely small width and the end portions of the lead wires of said coils are wound around the waist portions of said coil connecting portions, said first and second supporting wires are overlapped with the lead wires wound around the waist portions of said first and second coil connecting portions when viewed from above and are connected to these wound lead wires with solder, and wherein said coil connecting portions are shaped, when viewed from above, to include a rectangular root connecting portion protruding from said corner in parallel with one of the sides of the rectangular shape of said lens frame and a rectangular tip connecting portion protruding from said root connecting portion such that it intersects with said side of said lens frame in such a manner that the corner portion of said root connecting portion near the tip end portion and the corner portion of said tip connecting portion near said lens frame are overlapped and coupled with each other, and the continuous two sides form said waist portions at the intersection of said root connecting portion and said tip connecting portion when viewed from above.

4. An optical pickup for irradiating a disc-type recording medium mounted along a surface which is parallel with a surface of a flat-plate type base portion with light through an objective lens, the optical pickup comprising:

a lens frame to which said objective lens is mounted, which can move along the surface of said disc-type recording medium, and which has first to fourth side surfaces corresponding to four sides of a substantially rectangular shape when viewed from above;

a plurality of first supporting wires mounted to the first side surface of said lens frame to support the lens frame and a plurality of second supporting wires mounted to the second side surface opposite to said first side surface to support the lens frame;

a supporting-wire holding portion which extends upwardly and intersects with the surface of said flat-plate type base portion to hold root portions of said first and second supporting wires and to extend the supporting wires toward said lens frame; and a plurality of coils mounted to said lens frame to generate forces for moving the lens frame, wherein said lens frame includes a first protruding portion protruding outwardly from said first side surface and a second protruding portion protruding outwardly from said second side surface, these protruding portions on the first and second side surfaces are both provided with through-holes for passing said first and second supporting wires therethrough, and said first and second supporting wires are secured in the through-holes with an adhesive, said lens frame also includes a plurality of first coil connecting portions protruding away from said supporting-wire holding portion at the corner at the intersection of the first side surface and the fourth side surface opposite to the third side surface faced to said supporting-wire holding portion and a plurality of second coil connecting portions protruding away from said supporting-wire holding portion at the corner at the intersection of the second side surface and said fourth side surface, the first and second coil connecting portions are provided with cutout-tapered portions forming waist portions with an extremely small width and the end portions of the lead wires of said coils are wound around the waist portions of said coil connecting portions, said first and second supporting wires are overlapped with the lead wires wound around the waist portions of said first and second coil connecting portions when viewed from above and are connected to these wound lead wires with solder, and wherein said protruding portions are provided at positions which do not exist on the lines elongated in the directions of windings of the lead wires of said coils wound around said coil connecting portions.

* * * * *